United States Patent Office 2,805,544
Patented Sept. 10, 1957

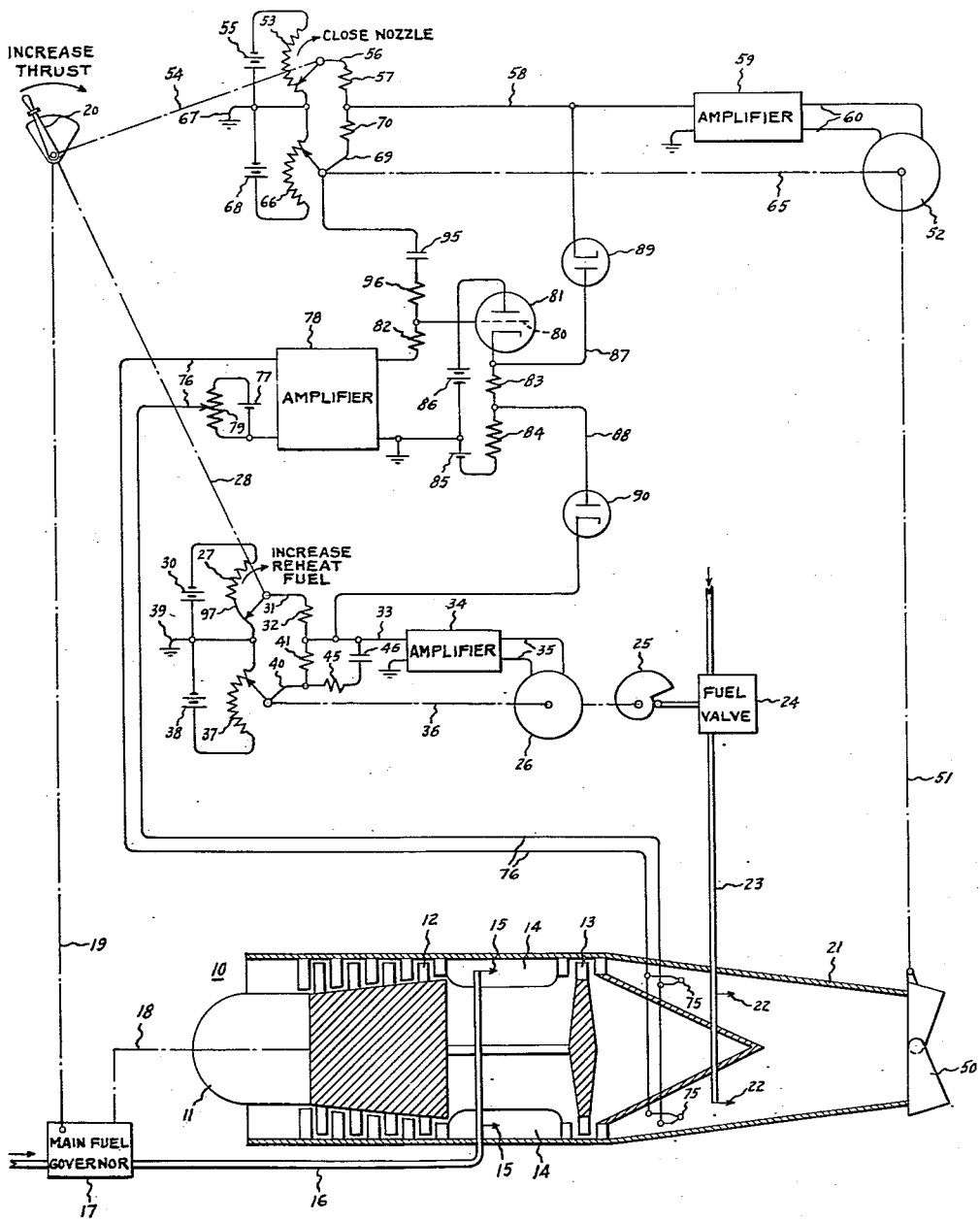

2,805,544

CONTROL SYSTEM FOR VARIABLE EXHAUST AREA REACTION POWER PLANT

Bruce A. Wells, Schenectady, N. Y., assignor to General Electric Company, a corporation of New York Application January 31, 1952, Serial No. 269,311

7 Claims. (Cl. 60—35.6)

This invention relates to an improved control system for a reaction power plant having a variable exhaust area and more particularly to such a system which is especially adapted to prevent over temperature conditions in a variable exhaust area power plant by control of both exhaust area and motive fluid input.

In reaction power plants, it is generaly desirable to burn as much fuel as possible to obtain a maximum power output, when required, without causing high temperature damage. One mode of accomplishing this purpose in an aircraft gas turbine reaction power plant for instance, is in the employment of "after burners" or "reheat" fuel burning apparatus in the tail pipe of the gas turbine, down stream from the turbine itself. Since the tail pipe can withstand much higher temperatures than the turbine, a large temperature rise may be safely attained by the introduction of reheat fuel in the tail pipe and a corresponding large augmentation of engine thrust may be obtained by this means. Such an increase in the fuel burning capacity of a gas turbine may require a larger engine exhaust area than is normally available so that, when reheat fuel burning is provided, a tail pipe exhaust nozzle having a variable exhaust area may be necessary.

In such a system, it will be understood that the engine temperature may be regulated by the amount of reheat fuel which is introduced, and the engine exhaust area opening, as well as directly by the amount of main engine fuel which is introduced in the usual combustion chambers ahead of the turbine. The quantity of re-heat fuel which is burned, as well as the exhaust nozzle opening, not only control the tail pipe temperature but also have an effect on the turbine temperature even though the turbine is located upstream from both the re-heat burners and the exhaust nozzle. This is true because both closure of the exhaust nozzle opening and the introduction of more reheat fuel tend to increase the static tail pipe pressure. The pressure drop across the turbine is thereby momentarily reduced until the resulting decrease in speed causes the engine speed governor system to increase the main combustion chamber fuel and consequently higher temperatures are achieved upstream from the turbine and in the turbine itself.

Reduction and control of the temperature by opening the engine exhaust nozzle (or limiting the closure thereof) to provide a larger exhaust area is more desirable than temperature reduction by reduction and limitation of the amount of fuel. This is true because a larger nozzle opening does not reduce the net thrust in direct proportion to the increased exhaust area. Although the increased exhaust area permits a reduction in the velocity of exhaust gases, a larger volume of gases may pass through the nozzle at a given velocity so that a larger engine is effectively obtained by increased nozzle area and these two factors partially compensate for one another. Accordingly, it is one object of this invention to provide an improved sequential temperature limiting control for a gas turbine reaction power plant of the type having a variable exhaust area in which the engine temperature is sequentially limited by opening movement of the exhaust nozzle and then by limitation of the fuel supply.

One system for providing such a sequential temperature control is shown and described and forms a portion of the invention which is claimed in patent application, Serial No. 102,387 filed June 30, 1949, by John H. Baker for a "Control for Gas Turbine Power Plant," now Patent No. 2,699,646 issued Jan. 18, 1955, and assigned to the same assignee as the present invention. The system described in that patent application relies, for the sequential operation, on the actuation of limit switches upon the maximum opening of the nozzle to shift the temperature control over to limit fuel. That system is generally satisfactory; however, if the nozzle or nozzle opening mechanism should become disabled in any way so that the variable nozzle could not achieve the maximum open position to actuate the limit switch, the reheat fuel limiting temperature control would never come into operation and no temperature limiting control would be available for the system.

Accordingly, it is a further object of this invention to provide an improved sequentially operating nozzle opening and fuel limiting temperature control system for a reaction power plant having a variable exhaust area in which a sequence of operation by the variable nozzle mechanism and the fuel limiting control are normally provided, but in which the fuel limiting temperature control is available and operative whenever the opening of the nozzle fails to keep the temperature within safe limits no matter what degree of opening the nozzle may have achieved.

Another object of this invention is to provide an improved sequentially operating maximum temperature limiting control for a reaction power plant for sequentially controlling the exhaust area and an input of motive fluid which is characterized by extreme simplicity, economy and reliability.

Another object of this invention is to provide an improved maximum temperature limiting control for sequentially limiting the exhaust area and a motive fluid input to a power plant in which the time lag in the transfer from one portion of the sequence to another is reduced to an absolute minimum.

A still further object of this invention is to provide a sequential maximum temperature limiting power plant control which normally provides for sequential opening of the exhaust area and limitation of a motive fluid input but in which concurrent opening of the exhaust area and limitation of motive fluid may be obtained under extreme conditions where the temperature may increase at a faster rate than can be compensated for by the rate of opening of the exhaust area.

Another object of this invention is to provide an improved sequential exhaust area opening and motive fluid limiting maximum temperature limit control for a reaction power plant in which the variable exhaust area control system normally has a fast response, unimpeded and undiminished by unnecessary stabilization signals, but in which adequate stabilization is provided for the nozzle area varying portion of the system upon initiation of the temperature limiting phase of the exhaust nozzle opening control.

In carrying out the objects of this invention, a power plant control system may be employed in which a temperature limiting control may cause actuation of a power plant exhaust area varying regulator in the exhaust area increasing direction in order to limit the temperature to a first maximum value, and then, upon inability of the temperature limiting exhaust area varying regulator to further limit the power plant temperature, either because of achievement of maximum exhaust area or for any other reason, the temperature limiting control causes actuation of a motive fluid regulator to limit motive fluid flow to thereby limit the power plant temperature to a maximum value slightly greater than the first mentioned maximum value.

For a better understanding of this invention, reference should be made to the following specification and the accompanying drawing which is a schematic diagram of a preferred embodiment of the present invention.

Referring more particularly to the drawing, there is schematically shown an aircraft gas turbine power plant of the type commonly referred to as a turbo jet and designated as a whole as 10 having a rotor 11 including a compressor section 12 and a turbine wheel 13. Fuel is supplied to main combustion chambers 14 as shown at 15 from a main fuel line 16. The volume of fuel supplied to the line 16 may be controlled by a main fuel governor 17 which may be a conventional speed control fuel governor having a connection to the rotor 11 as schematically shown at 18 for detection of the rotor speed. Various speed settings may be selected by the power plant operator through a mechanical connection from the main fuel governor 17 such as schematically illustrated as the shaft 19 extending from a thrust selector quadrant 20.

The engine 10 includes a tail pipe 21 which receives the gases exhausted from the turbine 13 and provision may there be made for the introduction of additional fuel as indicated at 22 from a second fuel line 23. This is sometimes referred to as "reheat" fuel or as "after burner" fuel. The flow of reheat fuel through fuel line 23 may be controlled by a fuel valve 24 which may be a conventional structure for providing a flow proportional to the position of a valve positioning cam such as the cam 25. The position of cam 25 is determined by a positioning motor 26 and the energization of motor 26 for changing the setting of fuel valve 24 may be controlled by a potentiometer 27 connected by a shaft 28 to the thrust selector 20 through a circuit which is described as follows:

The reheat fuel selector potentiometer 27 is connected across a source of potential such as the battery 30 and the voltage which is selected by the setting of potentiometer 27 is transmitted through a connection 31, a resistor 32 and a connection 33 to an amplifier 34. This voltage then causes energization of the amplifier 34 for actuation of the motor 26 through motor connections 35 to thereby adjust the position of cam 25 and the fuel control valve 24. The motor shaft 36 includes an extension to a follow-up potentiometer 37 which is connected across a source of voltage such as a battery 38. The followup potentiometer 37 has a common connection with the selector potentiometer 27 at the ground connection 39 and according to the connections of the batteries 30 and 38 shown, the outer ends of the potentiometers 27 and 37 are at opposite polarities with respect to ground. Movement of the follow-up potentiometer 37 by the motor shaft 36 in response to energization of the system by initial movement of potentiometer 27 is in the direction to produce a voltage change at the brush of potentiometer 37 having a polarity opposite to the polarity of the voltage change at connection 31 resulting from the initial movement of the brush of potentiometer 27. This opposite polarity voltage from potentiometer 37 is transmitted through a connection 40 and a resistor 41 to the connection 33 which constitutes the input connection to the amplifier 34. The signals from the potentiometers 27 and 37 are, therefore, added together at the common connection 33 through the resistors 32 and 41. Resistors 32 and 41 may preferably have equal resistance values and it will then be seen that, when the voltage at connection 40 from potentiometer 37 is exactly equal in magnitude, but of an opposite polarity, to the voltage provided at connection 31 by the selector potentiometer 27, the common connection 33 will be at ground potential and there will be no signal input to the amplifier 34. This characteristic provides the "follow-up" action which is desired whereby any selected change in the flow of reheat fuel is accomplished by movement of the thrust selector 20, selecting a new voltage on potentiometer 27, providing a signal at connection 33 to the amplifier 34, causing movement of the motor 26 to change the setting of fuel valve 24. When the desired adjustment has been achieved, the follow-up potentiometer 37 will have been moved to a position providing a voltage matching the voltage selected by the potentiometer 27 to cause a balancing of the signal at connection 33 so that there is effectively no input to the amplifier 34.

Transient stabilization for this reheat fuel valve positioning portion of the system may be obtained by a series connected resistor and capacitor combination 45 and 46 which is connected in parallel with the resistor 41. As will be understood, since this is a direct current system, the capacitor 46 is effectively an open circuit from the standpoint of static system conditions. However, rapid changes in the position of motor 26, causing rapid movement of the potentiometer 37 and rapid changes in the voltage across resistor 41 cause transmission of a voltage change through the stabilization circuit including resistor 45 and capacitor 46 to the connection 33 to provide an "anticipation" signal for the promotion of transient stability. When the charge on capacitor 46 adjusts to the new voltage level corresponding to the new setting of potentiometer 37, this signal will be dissipated.

The tail pipe 21 of the engine 10 is terminated by a variable area exhaust nozzle mechanism 50 which is connected through a mechanical linkage schematically shown as a shaft 51 to a nozzle area varying motor 52. The energization of motor 52 for variation in the nozzle area may be obtained in response to changes in setting of a potentiometer 53 which may be adjusted through a shaft 54 connected to the thrust selector 20. The potentiometer 53 may be connected for control of the motor 52 by means of a system which is almost identical to that employed between the reheat fuel selector potentiometer 27 and the adjusting motor 26. A voltage is applied across the nozzle selector potentiometer 53 from a source such as a battery 55. The signal derived from selector potentiometer 53 is transmitted through a connection 56, a resistor 57 and a connection 58 to an amplifier 59 which is connected for energization of motor 52 by output lines 60. An extension of the shaft 51 of motor 52, schematically shown at 65, is connected to a follow-up potentiometer 66 having a common ground connection 67 with the selector potentiometer 53 and a source of voltage 68 of a polarity approximately equal and opposite to the polarity of battery 55. The follow-up potentiometer 66 therefore supplies a signal of a polarity opposite to that supplied by selector potentiometer 53 which is transmitted through connection 69 and resistor 70 to the common amplifier input connection 58 so that when the selected nozzle position has been attained, as indicated by the positioning of motor 52, the follow-up potentiometer 66 is positioned so as to provide a voltage exactly counter balancing the voltage supplied from the selector potentiometer 53 so that there is no input voltage at the common amplifier input connection 58. It will be seen that the portion of the system interconnecting selector potentiometer 53 and motor 52 as thus far described may be substantially identical to the portion interconnecting the reheat fuel selector potentiometer 27 and motor 26. A transient stabilization circuit exactly corresponding to the reheat stabilization circuit, including resistor 45 and capacitor 46 is not provided, however. The portions of the system just described, respectively providing for control of the nozzle opening and of the reheat fuel valve setting may be referred to below as the nozzle and re-heat governors.

A number of temperature sensing devices such as thermocouples 75, only two of which are shown in the schematic diagram, may be provided within the tail pipe 21 of the engine 10 in order to measure the tail pipe temperatures. As the turbine 13 may be the most critical engine component from the standpoint of over-temperature damage, these thermocouples 75 may preferably be placed at the very best location for determining turbine temperature in terms of the temperature of the gases exhausted therefrom. The temperature signals derived from thermocouples 75 may be transmitted through connections 76 to a temperature control circuit including a source of standard voltage 77, and an amplifier 78. By means of an adjustable potentiometer 79 connected across the standard voltage source 77, a voltage is selected for opposition to the thermocouple voltage for an exact balance at a desired maximum engine temperature. Upon deviation from that temperature, a resultant temperature error signal voltage is supplied to the amplifier 78. The output of the amplifier 78 is supplied to the control grid 80 of an electron discharge device 81 through a coupling resistor 82. The circuit from the cathode of device 81 to the amplifier 78 is completed through cathode resistors 83 and 84 and a source of cathode bias voltage such as the battery 85. The anode circuit of the device 81 is completed by a source of voltage such as the battery 86. Connections are respectively made from the cathode follower resistors 83 and 84 at 87 and 88 through diodes 89 and 90 to the respective amplifier input connections 58 and 33.

Upon the achievement of the maximum desired temperature as detected by the thermocouples 75, the temperature circuit, including amplifier 78, becomes effective so that any temperature rise above the maximum value causes the transmission of an amplified voltage signal through coupling resistor 82 to grid 80 of device 81 causing the device 81 to become conductive. Temperatures below the maximum merely reduce the potential of grid 80 so that conduction in device 81 is not initiated.

Upon conduction in device 81, voltages appear across the cathode follower resistors 83 and 84. When sufficient conduction of device 81 is achieved, to more than overcome the bias provided by bias voltage source 85, a positive voltage above ground will appear at connection 87 to the plate of diode 89 which causes conduction in the diode 89 to effectively establish a connection therethrough to the positive potential supplied by the cathode follower resistors 83 and 84 to the connection 58.

It will be seen from an analysis of the polarities of the voltages indicated for the nozzle control circuit that a positive potential at connection 58 causes actuation of the nozzle positioning motor 52 in the opening direction. As discussed above, such enlargement of the exhaust area will cause a reduction in engine temperature, which is exactly the action desired upon any increase above the maximum temperature which has been selected.

Likewise, a positive voltage at connection 88 to the plate of diode 90 caused by conduction by device 81 will cause conduction in the diode 90 and a resulting positive voltage at connection 33 in the reheat fuel positioning valve circuit to cause a change in the setting of fuel valve 24 to reduce the fuel flow which will likewise reduce the engine temperature. These temperature limiting actions of the nozzle and reheat circuits are substantially independent of the positioning of the nozzle and reheat selector potentiometers 53 and 27.

It will be seen from the connections shown that the potential of connection 87 will be more positive than that of connection 88 by the amount of the voltage drop across cathode resistor 83. This means that, upon gradual increase in the conduction of device 81, the diode 89 will become conductive before the diode 90 and temperature limiting control of the nozzle circuit, opening the nozzle area will occur before any temperature control action is established in the reheat fuel valve positioning circuit. If any conditions are achieved in the system where engine temperature is not adequately limited by operation of the nozzle circuit to open the exhaust nozzle area, upon only a slight additional rise in temperature, causing a slight additional amount of conduction of device 81, the voltage available at connection 88 from the drop across cathode follower resistor 84 is alone enough to cause conduction in diode 90 and actuation of the reheat fuel circuit to limit fuel input, to thereby limit engine temperature. The temperature rise from the point at which maximum temperature limiting is obtained by opening of the nozzle, and the point at which it is obtained by limiting the reheat fuel may normally be selected at less than 2% of the total temperature rise of the engine above the ambient temperature. This difference in the maximum temperatures which are held is therefore practically insignificant from the standpoint of prevention of engine damage, but the advantages in obtaining a sequential operation of the nozzle opening mechanism and the reheat fuel valve positioning mechanism in this manner are very great.

The usual condition under which temperature limitation by continued opening of the exhaust nozzle area is unattainable, so that limitation of the reheat fuel flow is necessary, occurs when maximum exhaust nozzle area opening is achieved. However, the exhaust nozzle area varying mechanism may also become jammed or damaged so that maximum exhaust nozzle opening cannot be achieved in order to limit the temperature. The reheat fuel limiting circuit including the connection available through the diode 90 is therefore immediately effective and available to limit the power plant temperature by reducing the reheat fuel flow, regardless of nozzle position. Obviously, reduction of the temperature by this fuel flow reducing circuit is also available where the rate of temperature rise is so fast that the nozzle cannot be opened fast enough to accommodate for it.

It will be seen that the temperature limiting circuit including thermocouples 75, the amplifier 78 and the associated apparatus which is respectively connected to the nozzle circuit and reheat circuit through diodes 89 and 90 is effective only upon the attainment of the maximum temperature as determined by the adjustment of the reference temperature voltage potentiometer 79. Under all other operating conditions, the nozzle opening and reheat fuel flow settings are made entirely by the selecting potentiometers 53 and 27 which may both be controlled by the single thrust selector 20. It will be seen that the connections of the temperature circuit through the diodes 89 and 90 establish a one-way limiting type of control. That is, only a positive voltage may be supplied to the amplifier input connections 58 and 33 through the respective diodes 89 and 90 in order to cause a temperature reduction. Independent operation of either of the selector potentiometers 53 or 27 in a power plant temperature reducing direction (opening of the nozzle or decreasing reheat fuel) will cause operation of the individual control circuit independent of the temperature limiting circuit even though the temperature limiting circuit may then be in operation, if the independent operation of the potentiometers 53 or 27 carries the power plant temperature below the temperature circuit operating point.

When the temperature limiting circuit range of operation is reached, where either of diodes 89 or 90 is conductive, when a relatively static condition has been obtained, a negative voltage value will have been selected by the selector potentiometer 53 or 27 which would, but for the temperature limit circuit, result in a temperature higher than the maximum at which the temperature limit circuit is effective. Explained in terms of the nozzle circuit, the selected negative voltage is balanced not only by the positive voltage from the follow-up potentiometer 66, but by a voltage drop due to the current through the diode 89 which flows through the coupling resistor 57 so as to cause a greater drop in the resistor 57 than in the resistor 70 to bring the amplifier input voltage at connection 58 to zero. Viewed in another sense, because of the additional voltage drop in resistor 57 due to the current in diode 89, the follow-up potentiometer 66 causes rebalancing of the nozzle servo system at a larger nozzle opening than is selected where a smaller voltage drop is attained across resistor 70.

Normally, the nozzle circuit preferably has as fast a response as possible, undiminished by any appreciable amount of stabilization. It will be understood that some stabilization may be required, however, between the motor 52 and the amplifier 59. Such stabilization may be incorporated in a number of conventional ways. However, when temperature limit operation of the nozzle is attained, system stability may become a problem, primarily because of the thermal time lag of the thermocouples. It is therefore desirable to have a very fast response under ordinary operating conditions, but to have an anticipation stabilization for the nozzle circuit, when in the temperature limit range of operation. Accordingly, a connection is provided from the nozzle motor position follow-up potentiometer 66 through a capacitor 95 and a resistor 96 to the grid 80 of the device 81 to provide a transient "anticipation" signal voltage upon any change in the adjustment of the nozzle 50. This connection stabilizes the nozzle circuit only during the temperature limit phase of operation since grid 80 does not otherwise control this circuit. Under all other operating conditions, the nozzle regulator is entirely free to operate with a fast transient response, unimpaired by such a stabilization signal. Such stabilization of the reheat system is provided by the circuit including resistor 45 and capacitor 46 as previously described. Removal of this stabilization on other than temperature limit operation of the reheat fuel circuit is unnecessary.

It will be understood that the connections from the thrust selector 20 indicated by the shafts 54, 28, and 19 do not necessarily provide direct linear motion of each of the three portions of the system to which they are connected for a given movement of the thrust selector 20. Mechanical cams (not shown) may be provided in these connections for imparting adjustments to the various portions of the system in accordance with predetermined schedules with varying angles of thrust selector movement. Such non-linearity may preferably be provided in the electrically controlled nozzle and reheat portions of the system by the employment of selector potentiometers 53 and 27 having non-linear resistance characteristics to provide the desired schedule. This is preferred since the elimination of the cams results in a reduction in the size and weight of the apparatus. As shown, an effective lost motion arrangement is also electrically provided for in the inclusion of a non-resistive portion 97 on the reheat fuel selector potentiometer 27.

In the normal operation of the system, therefore, as the thrust selector 20 is advanced, the main fuel governor setting may be raised through connection 19 to a point where maximum speed is attained. At the same time the nozzle opening may be gradually reduced by clockwise rotation of the shaft 54, changing the setting of the selector potentiometer 53. The setting of the potentiometer 27 will also be advanced in a clockwise direction by the shaft connection 28 until the non-resistive portion 97 of this potentiometer has been crossed by the sliding contact, at which time reheat fuel flow will be initiated. At some point in this thrust increasing operation of the system, the maximum power plant temperature will be achieved and the resultant conduction of diode 89 will begin to cause temperature limit overriding operation of the nozzle control to gradually re-open the nozzle in opposition to the nozzle closing schedule voltage available from the selector potentiometer 53. Of course, if a point is reached where the opening operation of the nozzle can no longer limit the power plant temperature, the diode 90 becomes conductive to reduce the reheat fuel valve setting below that scheduled by the reheat fuel selector potentiometer 27.

It will be seen from the above description that the present invention provides a simple and reliable temperature limiting system for a variable exhaust area engine in which over temperature engine damage is guarded against in a very positive manner by relatively independent exhaust area opening and fuel limiting portions of the system, but in which the ideal sequential operation of these portions of the system is normally available.

Although the desirability of a variable area exhaust nozzle for a reheat fuel burning engine has been emphasized above, such a structure has also been found to be very useful in what is termed a "dry" engine, in which no provision for augmentation of thrust is provided, such as by the introduction of reheat fuel or by the introduction of water in the tail-pipe for the augmentation of thrust by the water vapor. In a dry engine, similar advantages are obtained, that is, varying the exhaust area effectively changes the size of the engine and a larger exhaust area permits the burning of a larger amount of fuel in the main combustion chambers. In an engine which is specifically designed for dry operation with a variable exhaust nozzle, it may be possible to over-heat the engine under certain conditions by the introduction of too much fuel, even with the maximum exhaust area. Accordingly, it is desirable in such an engine to limit the flow of main fuel in order to limit the maximum engine temperature after the maximum exhaust area has been achieved. It will be understood therefore that the temperature limiting fuel control portion of the system disclosed above could be used to limit fuel in a dry engine. In a reheat fuel burning engine such as the one for which the control system is disclosed in this application an over-temperature condition with full nozzle opening is less likely to occur with main fuel alone than with both main fuel and reheat fuel burning. Accordingly, it is desirable in such an engine to limit the temperature after maximum nozzle area is achieved by limiting the rate of reheat fuel flow. There are a number of reasons for this. One of the most important of them is that reheat fuel burning produces power much less efficiently than main fuel burning.

Obviously then, the system could also be modified to provide a three-step sequence to limit engine temperature by opening the nozzle, reducing reheat fuel, and then reducing main fuel directly, rather than the two-step sequence shown. In such a system, an additional cathode follower resistor for device 81 would be provided with a resistance value about the same as resistor 83 and having a connection through an additional diode to an electrical main fuel control circuit. One such circuit which would be suitable in such a system is disclosed in co-pending patent application, Serial No. 264,178 filed December 31, 1951 by Clinton C. Lawry and Bruce A. Wells on an Electrical Speed Control System for Engines, which is assigned to the same assignee as the present invention.

While only one embodiment of this invention has been shown and described, it will be understood that various changes and modifications other than those suggested may be made by those skilled in the art. The appended claims are, therefore, intended to cover any such modifications within the true spirit and scope of the invention.

What I claim as new and desire to secure by Letters Patent of the United States is:

1. A system for sequentially limiting two temperature control parameters of a power plant comprising direct current voltage polarity responsive positioning circuits for each of said parameters, a temperature circuit responsive to power plant temperature for providing voltages of temperature lowering polarities upon the achievement of a maximum power plant temperature range, connections including unidirectional conductive devices for conveying the voltages of temperature lowering polarities from said temperature circuit to said positioning circuits.

2. A system for sequentially limiting two temperature control parameters of a power plant comprising direct current voltage polarity responsive positioning circuits for each of said parameters, a temperature circuit responsive to power plant temperature for providing voltages of temperature lowering polarities upon the achievement of a maximum power plant temperature range, connections including unidirectional conductive devices for conveying the voltages of temperature lowering polarities from said temperature circuit to said positioning circuits, the voltages supplied from said temperature circuit to said parameter control circuits respectively achieving the temperature reducing polarity in sequence.

3. A system for controlling two temperature limiting parameters of a power plant including a separate direct current voltage responsive circuit for the control of each parameter, a temperature circuit including engine temperature measuring devices for producing two direct current voltages in response to signals derived from said temperature sensing devices which shift from engine temperature raising polarities to engine temperature lowering polarities at two predetermined desired engine temperature levels, connections from said temperature circuit for conveying said direct current-voltages respectively to said parameter control circuits including unidirectional conductive devices for conducting direct currents at temperature circuit voltages of temperature lowering polarities only.

4. A control system for a variable discharge area reaction power plant comprising means for regulating the flow of motive fluid to the power plant, means for varying the exhaust area of the power plant, manual means for concurrently adjusting said motive fluid regulating means and said exhaust area varying means to vary the power output of the power plant, means for measuring a temperature within the power plant, a temperature control circuit connected to said temperature sensing means, said temperature control circuit being connected to said exhaust area varying means for actuation thereof in the exhaust area opening direction to maintain a first predetermined maximum temperature, a second connection from said temperature control circuit to said motive fluid regulating means for limiting the flow of motive fluid to the engine to maintain a second predetermined maximum temperature, said second predetermined maximum temperature being slightly higher than said first predetermined maximum temperature.

5. An electrical control system for aircraft gas turbine reaction power plants comprising direct current voltage responsive electrical positioning systems for varying the discharge nozzle area and the reheat fuel flow, thermocouple temperature measuring devices for measuring a power plant temperature, a temperature circuit connected to receive the temperature measurement signals from said thermocouples, said temperature circuit including a source of temperature standard voltage connected in series opposition to the voltages derived from said thermocouples, the output of said temperature circuit including a first connection to said nozzle area positioning system for providing an output potential which shifts from a temperature-raising to a temperature-lowering polarity as the engine temperature increases to a first maximum temperature level and a second output connection to said reheat fuel positioning system for providing an output potential which shifts from a temperature-raising to a temperature-lowering polarity as the temperature of the power plant is raised to a second maximum temperature level slightly above said first level, each of said output connections including rectifying elements for conduction in response to impressed potentials of only the temperature-lowering polarity.

6. A control system for an aircraft gas turbine power plant having reheat fuel burning for augmentation of thrust and a variable exhaust area, comprising a speed responsive governor for controlling the flow of main fuel, and adjustable governors for regulating the flow of reheat fuel and the exhaust area opening, a single manually operated thrust selector lever connected to simultaneously adjust the settings of said main fuel, reheat fuel, and exhaust area varying governors in accordance with a predetermined desired schedule, a plurality of temperature sensing devices connected together and arranged to sense the exhaust temperature of said turbine, an electrical temperature control circuit connected for actuation in response to signals from said temperature sensing devices and connected to said exhaust area governor for taking over the operation thereof for maintenance of a first maximum temperature level upon selection of an exhaust area which would otherwise result in a higher temperature, a connection from said temperature control circuit to said reheat fuel governor for taking over the operation thereof for maintenance of a second maximum temperature level slightly higher than said first maximum temperature level upon selection of reheat fuel flows which would otherwise result in a higher temperature, a voltage change device connected to said exhaust area governor for providing a change in voltage upon movement thereof and a connection from said voltage change device to said temperature control circuit including a capacitor for providing a transient stabilization signal to said temperature control circuit upon movement of said exhaust area governor.

7. A control system for a variable discharge area reaction power plant comprising means for regulating the flow of motive fluid to the power plant, means for varying the exhaust area of the power plant, means for measuring a temperature within the power plant, a temperature control circuit connected to said temperature sensing means, said temperature control circuit being connected to said exhaust area varying means for actuation thereof in the exhaust area opening direction to maintain a first predetermined maximum temperature, a second connection from said temperature control circuit to said motive fluid regulating means for limiting the flow of motive fluid to the engine to maintain a second predetermined maximum temperature, said second predetermined maximum temperature being slightly higher than said first predetermined maximum temperature.

No references cited.